United States Patent
Egger et al.

(10) Patent No.: US 8,704,476 B2
(45) Date of Patent: Apr. 22, 2014

(54) METHOD AND DEVICE FOR DETECTING AN ENTRAPMENT SITUATION

(75) Inventors: Andreas Egger, Vienna (AT); Stefan Holzinger, Vienna (AT); Roman Morawek, Vienna (AT)

(73) Assignee: Continental Automotive GmbH, Hannover (DE)

( * ) Notice: Subject to any disclaimer, the term of this patent is extended or adjusted under 35 U.S.C. 154(b) by 208 days.

(21) Appl. No.: 13/266,294

(22) PCT Filed: Apr. 13, 2010

(86) PCT No.: PCT/EP2010/054777
§ 371 (c)(1),
(2), (4) Date: Oct. 26, 2011

(87) PCT Pub. No.: WO2010/124927
PCT Pub. Date: Nov. 4, 2010

(65) Prior Publication Data
US 2012/0112677 A1    May 10, 2012

(30) Foreign Application Priority Data
Apr. 27, 2009   (DE) .......................... 10 2009 019 015

(51) Int. Cl.
*H02P 1/00*           (2006.01)

(52) U.S. Cl.
USPC ............. 318/453; 318/266; 318/466; 73/760; 307/9.1

(58) Field of Classification Search
USPC ......... 318/282, 266, 445, 452, 453, 466, 469; 73/760; 307/9.1
See application file for complete search history.

(56) References Cited

U.S. PATENT DOCUMENTS

| | | | | |
|---|---|---|---|---|
| 6,504,332 | B1  |  1/2003 | Lamm ........................... | 318/445 |
| 6,840,113 | B2* |  1/2005 | Fukumura et al. .............. |  73/760 |
| 7,085,200 | B2* |  8/2006 | Okada et al. .................. | 369/30.1 |
| 7,259,532 | B2* |  8/2007 | Shinohara ..................... | 318/282 |
| 7,319,301 | B2* |  1/2008 | Pribisic ........................ | 318/468 |
| 8,089,230 | B2  |  1/2012 | Fuchs et al. ................... | 318/286 |
| 8,456,121 | B2* |  6/2013 | Yuasa et al. ................... | 318/469 |
| 2002/0093301 | A1* |  7/2002 | Itami et al. ..................... | 318/452 |
| 2002/0180269 | A1* | 12/2002 | Dalakuras et al. ............. | 307/9.1 |

(Continued)

FOREIGN PATENT DOCUMENTS

| | | | | |
|---|---|---|---|---|
| CN | 1321214 A | 11/2001 | ................. | B60J 1/17 |
| DE | 19633941 A1 | 2/1998 | ............. | H02H 7/085 |

(Continued)

OTHER PUBLICATIONS

International PCT Search Report and Written Opinion, PCT/EP2010/054777, 9 pages, Dec. 17, 2010.

(Continued)

*Primary Examiner* — Paul Ip
(74) *Attorney, Agent, or Firm* — King & Spalding L.L.P.

(57) ABSTRACT

To detect an entrapment situation when a driven component is adjusted using a mechanical adjustment system which has an electric motor (2), a value (Fakt) relating to the force acting upon the driven component is compared with a threshold value (FTh) relating to a reference value (FRef). The reference value (FRef), and thus the threshold value (FTh), are continuously matched, for the purpose of force tracking, with the force value which changes during the movement of adjustment depending on the mechanical system.

20 Claims, 6 Drawing Sheets

(56) References Cited

U.S. PATENT DOCUMENTS

| | | | |
|---|---|---|---|
| 2003/0051555 A1* | 3/2003 | Fukumura et al. | 73/760 |
| 2003/0146724 A1 | 8/2003 | Kessler et al. | 318/434 |
| 2004/0104701 A1* | 6/2004 | Ohshima | 318/445 |
| 2006/0061314 A1* | 3/2006 | Shinohara et al. | 318/466 |
| 2006/0119301 A1* | 6/2006 | Shinohara | 318/282 |
| 2007/0183182 A1* | 8/2007 | Pribisic | 365/145 |
| 2009/0058340 A1* | 3/2009 | Sakai et al. | 318/434 |
| 2010/0211273 A1 | 8/2010 | Köllner et al. | 701/49 |
| 2011/0043158 A1* | 2/2011 | Yuasa et al. | 318/599 |

FOREIGN PATENT DOCUMENTS

| | | | |
|---|---|---|---|
| DE | 10200606821 A1 | 8/2007 | E05F 15/20 |
| DE | 102007050173 B3 | 11/2008 | E05F 15/20 |
| WO | 02/06615 A2 | 7/2001 | E05F 15/00 |

OTHER PUBLICATIONS

Chinese Office Action, Application No. 201080018662.1, 10 pages, Oct. 18, 2013.

* cited by examiner

METHOD AND DEVICE FOR DETECTING AN
ENTRAPMENT SITUATION

CROSS-REFERENCE TO RELATED APPLICATIONS

This application is a U.S. National Stage Application of International Application No. PCT/EP2010/054777 filed Apr. 13, 2010, which designates the United States of America, and claims priority to German Application No. 10 2009 019 015.5 filed Apr. 27, 2009, the contents of which are hereby incorporated by reference in their entirety.

TECHNICAL FIELD

The invention relates to a method and to a device for detecting a trapping situation when a driven component is adjusted using a mechanical adjustment system comprising an electric motor, wherein a value ($F_{akt}$) which is related to the force acting on the driven component is compared with a threshold value ($F_{Th}$) which is related to a reference value $F_{Ref}$.

BACKGROUND

Adjustment systems or adjustment devices are used, for example, in motor vehicles to adjust windows or sunroofs as driven components. Other applications are, for example, those for the activation of electric tailgates or sliding doors, and therefore for the sake of simplicity reference is made below to driven components, if appropriate without restricting the generality. In such systems, there is furthermore provision, in particular on the basis of legal requirements, for trapping of an object, for example of a person's hand or head, during a closing movement to be detected. This trapping detection is based on a calculated closing course which is calculated, for example, from the rotational speed and the voltage and/or from the current of the electric motor which is provided for the drive. This closing force changes when an object is trapped. This change in the closing force, i.e. a relatively sudden increase in the force beyond a predefined threshold value, serves to make a decision about a trapping situation.

A change in the closing force can, however, also occur if no trapping situation arises, specifically owing to changed conditions during the adjustment movement such as, for example, owing to temperature change and therefore associated changes in frictional forces, in particular in seals, but also owing to contamination in the adjustment system and the like.

It is therefore necessary to be able to differentiate such fluctuations in force owing to changed peripheral conditions from those increases in force which are caused by trapped objects.

In order to be able to make such a differentiation, attempts have already been made to use the difference between the closing force at a specific time and the closing force at a defined preceding time as a criterion instead of the absolute value of the calculated closing force. The distance between the times is selected here such that the system is matched as well as possible to the rigidity of the objects to be detected. The described formation of differences eliminates the static influences; even comparatively small changes in force are therefore "filtered out". However, it is disadvantageous here that, on the one hand, there is a large requirement for buffering space for the comparison value from the past and that, on the other hand, only a limited section from the past is used for the trapping detection, and therefore information from further back in time is not used (cannot be used).

It would be desirable to be able to carry out the trapping detection on the basis of current force values. However, in this context it is necessary to take account, as mentioned above, of the problem that different (quasi-)static force levels may occur as a result of different mechanical behaviors, that is to say different peripheral conditions; in particular as a result of a corresponding mechanical behavior, the force profiles may exhibit a rising tendency even when trapping does not occur. Such changes in force can occur, for example, when starting, furthermore, in the case of sunroofs, owing to mechanically entrained components, for example wind deflectors and a sun shading means but also owing to system-related parameters such as, for example, heating of the electric motor or, as already mentioned, owing to dirt in the adjustment system.

Usually, a reference value is predefined as a basis for comparison in order then to be able to detect a trapping situation by comparison of the current force value with the reference value or with a threshold value which is permanently related thereto. The reference value is defined when the motor starts and is a constant value in previous anti-trapping systems. If appropriate, predictable reference changes, which are stored as characteristic curves, are taken into account, cf. for example DE 10 2007 050173 B3 or DE 19633941 A1. As has been stated above, owing to changed conditions it is then possible for the real force profile to move away from the anticipated force profile as a result of changes in conditions, in which case it is even possible for trapping to be detected even though no object is trapped. Increased trapping forces would also be possible, which, under certain circumstances, could cause legal requirements to be infringed.

SUMMARY

According to various embodiments, remedy to this can be provided and a method as stated at the beginning can be proposed in which a trapping situation can be reliably differentiated from other changes in force and detected without the need for large buffers.

According to an embodiment, in a method for detecting a trapping situation when a driven component is adjusted using a mechanical adjustment system comprising an electric motor, a value which is related to the force acting on the driven component is compared with a threshold value which is related to a reference value, and the reference value, and therefore the threshold value, are continuously approximated, in the sense of force tracking, to the force value which changes as a function of the mechanical system during the adjustment movement.

According to a further embodiment, the continuous approximation of the reference value can be limited in terms of absolute value in order to extract changes which are due to trapping processes. According to a further embodiment, in the case of positive deviations in the force values from the reference value, specifically $F_{akt}(s) \geq F_{Ref}(s)$ where s=the position of the driven component, the reference value can be approximated according to the relationship $$F_{Ref}(s+\Delta s) = F_{Ref}(s) + \min[(F_{akt}(s) - F_{Ref}(s)), F_{Limit}],$$

where s+Δs denotes the position following the position s, and $F_{Limit}$ denotes a predefined limiting value as a tracking limit. According to a further embodiment, in the case of negative deviations, that is to say $F_{akt}(s) < F_{Ref}(s)$, where s=the position of the driven component, the reference value can be approximated according to the relationship $$F_{Ref}(s+\Delta s) = F_{Ref}(s) - \min[(F_{Ref}(s) - F_{akt}(s)), F_{Limit}],$$

where s+Δs denotes the position following the position s, and $F_{Limit}$ denotes a predefined limiting value as a tracking limit. According to a further embodiment, a uniform limiting value $F_{Limit}$ can be predefined for the approximation both in the case of positive and in the case of negative deviations of the force values from the reference value. According to a further embodiment, a variable limiting value can be predefined for the limitation. According to a further embodiment, the limiting value can be dependent on the position of the driven component. According to a further embodiment, the limiting value can be dependent on fluctuations in the motor voltage. According to a further embodiment, a reference value profile based on stored characteristic curve data can be used as the basis for the approximation of the reference value. According to a further embodiment, a temporarily comparatively high limiting value can be used for a motor starting process in order to quickly approximate the reference value to the pronounced force changes during the starting process. According to a further embodiment, a limiting value which drops exponentially from a comparatively high initial value can be used. According to a further embodiment, a limiting value which is adjusted to the rigidity of trapped objects can be defined for the limitation, wherein the limiting value is higher the greater the degree of rigidity of the trapped object. According to a further embodiment, at least two force tracking processes can be carried out in parallel with different limiting values in order to perform adapted approximations of the reference value to the force values separately for trapped objects with different degrees of rigidity.

According to another embodiment, a device for detecting a trapping situation when a driven component can be adjusted using a mechanical adjustment system comprising an electric motor, wherein a value which is related to the force acting on the driven component is compared with a threshold value which is related to a reference value, characterized by computer means which are configured to carry out an approximation method as described above.

BRIEF DESCRIPTION OF THE DRAWINGS

The invention will be explained in more detail below on the basis of exemplary embodiments, to which, however, said invention is not to be restricted, and with reference to the drawing, in which, in particular.

DETAILED DESCRIPTION

Figure 1:
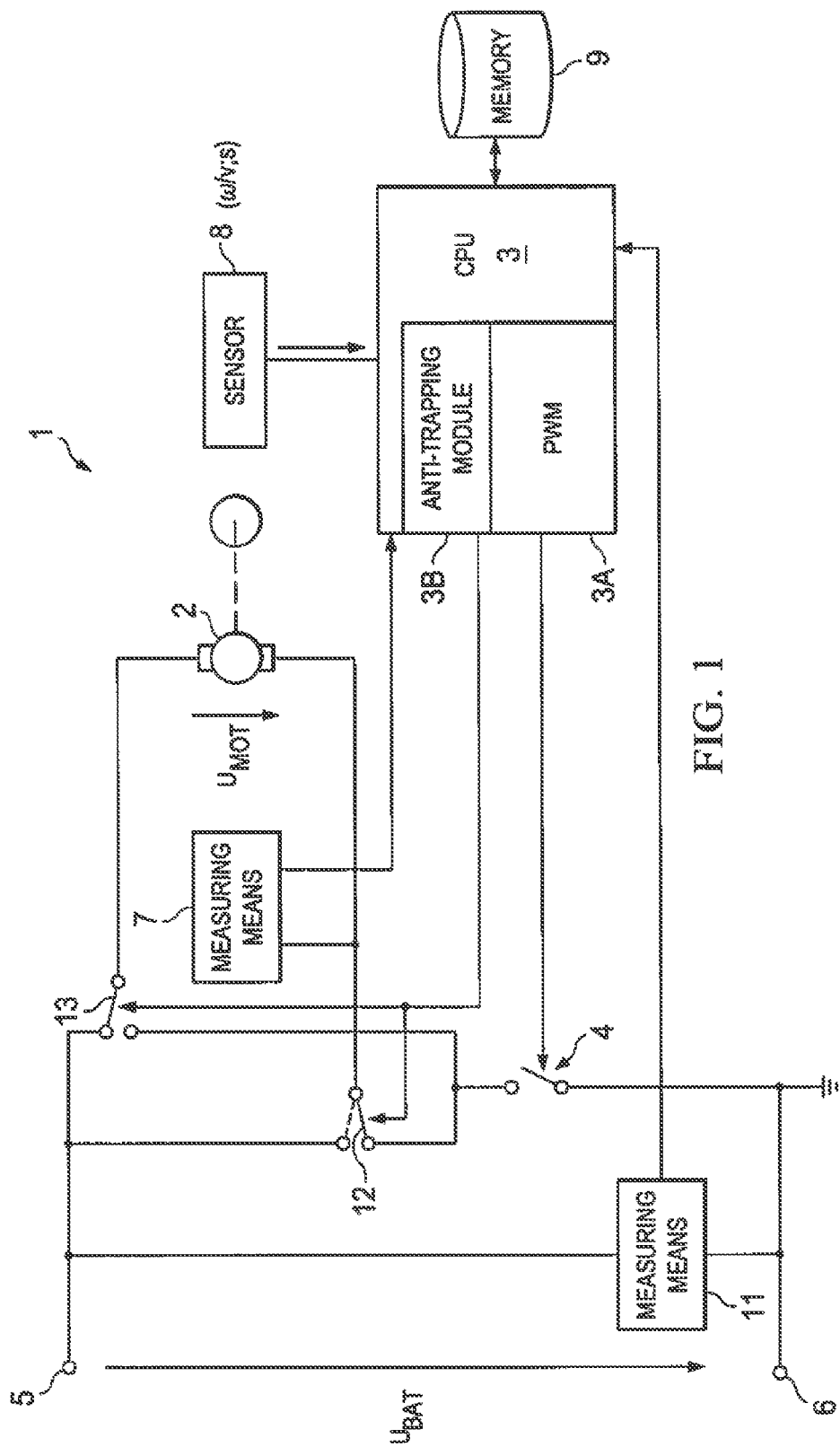
FIG. 1 shows a block circuit diagram of an embodiment of a mechanical adjustment system with an electric motor, for example for a motor vehicle window or else a sunroof, with anti-trapping protection.

The method according to various embodiments of the type specified at the beginning is characterized in that the reference value, and therefore the threshold value, are continuously approximated, in the sense of force tracking, to the force value which changes as a function of the mechanical system during the adjustment movement. In a corresponding way, the device according to further embodiments contains computer means which are configured to carry out an approximation method.

The present method is therefore based on the idea of compensating the slow deviation of the current force values from the anticipated forces by carrying out "force tracking" of the reference force. The reference force (reference value) is therefore made to continuously track the current force or the force values related thereto; accordingly, in parallel with this, the differential force, the exceeding of which through the actual force causes trapping to be detected, is also tracked in order to eliminate the changes in the force profile in the mechanical system, for example owing to difficulty of movement of a mechanism, as a possible reason for detection of trapping. On the other hand, in this context the—usually significantly steeper—changes in force which are due to trapping processes, to trapping of an object, are extracted from the described force tracking and/or if appropriate such changes in force are included only to a small extent in the approximation in order to be able to continue to reliably detect such trapping processes. This exclusion of increases in force resulting from trapping processes could occur, for example, on the basis that the rate of increase of the force profile in the case of trapping processes is significantly higher than that of mechanical system fluctuations, with the result that rates of increase which are averaged over a specific, short, time period can be used as the basis for the force tracking. A significantly simpler solution is obtained here if the continuous approximation of the reference value (and therefore of the threshold value), is limited in terms of absolute value in order therefore to extract changes which are due to trapping processes-relatively pronounced changes. As a result of this limitation of the force tracking, trapping processes are damped only insignificantly, in contrast to the fluctuations in the force profile owing to changed conditions in the mechanism. The limitation is expediently performed here in such a way that mechanical fluctuations are just compensated and no more. This can be done by providing correspondingly small (maximum) limiting values.

A simple algorithm is obtained for this if, in the case of positive deviations in the force values ($F_{akt}$) from the reference value, specifically $F_{akt}(s) \geq F_{Ref}(s)$, where s=the position of the driven component, the reference value ($F_{Ref}$) is approximated according to the relationship $$F_{Ref}(s+\Delta s)=F_{Ref}(s)+\min[(F_{akt}(s)-F_{Ref}(s)),F_{Limit}],$$

where $s+\Delta s$ denotes the position following the position s, and $F_{Limit}$ denotes a predefined limiting value as a tracking limit. In a corresponding way, it is also favorable for this if, in the case of negative deviations, that is to say $F_{akt}(s)<F_{Ref}(s)$, where s=the position of the driven component, the reference value is approximated according to the relationship $$F_{Ref}(s+\Delta s)=F_{Ref}(s)-\min[(F_{Ref}(s)-F_{akt}(s)),F_{Limit}],$$

where $s+\Delta s$ denotes the position which follows the position s, and $F_{Limit}$ denotes a predefined limiting value as a tracking limit.

These above mentioned limitations of the force tracking can be carried out easily and quickly by computational means, with conventional microprocessors, so that approximation of the reference value, i.e. force tracking, takes place in real time. In this context, particularly simple determination is carried out if a uniform limiting value $F_{Limit}$ is predefined for the approximation both in the case of positive and in the case of negative deviations of the force values from the reference value.

The present method can be advantageously also linked to the fact that for a respective mechanical adjustment system, mechanical characteristic diagrams are usually stored in a memory. In such a case, the reference force firstly follows a characteristic curve profile which results from the characteristic diagrams, and in addition approximation to the changing current force is provided in the sense of the prescribed force tracking.

The limiting value for the force tracking can be constant, but is not necessarily so. During the adjustment of a component, predefined by the mechanical system, different force values may occur such as are necessary, for example, directly after the starting of the motor, wherein in this phase relatively high forces then occur or are necessary for adjusting the component. For such phases with different force levels (static force levels) it is possible to provide, in an embodiment of the present method, that the limiting value is not constant but is, rather, variable; in particular, the limiting value can be a limiting value which is dependent on the position of the driven component, that is to say on the adjustment path. It is therefore possible for a relatively high limiting value to be used as the basis at the start of the adjustment, so that even pronounced force fluctuations can be compensated in this phase. At the start of the adjustment movement the reference force therefore most largely corresponds to the measured (current) force. The limiting value is then reduced successively until a constant low value is reached for the phase of uniform running of the motor. For example, an exponentially decreasing limiting value can be provided in this context.

A different possibility for a changed limiting value during an adjustment movement can result from known mechanical problem points being present in the adjustment system, for example in the case of a sunroof with a wind deflector, which can lead in certain situations, i.e. in certain positions of the sunroof, to relevant faults, for example comparatively large increases in force, as a function of temperature. In these position regions it is also possible to provide an increased limiting value from the outset in order to compensate the faults referred to above.

A further embodiment of the present procedure is that by providing a variable profile of the limiting value, fluctuations in voltage, for example fluctuations in the on-board power system voltage of a motor vehicle, are also compensated. It is therefore possible, for example, for an additive term to be included in an overall limiting value, which additive term changes as a function of such voltage fluctuations, resulting, for example, in a value of this term which rises quadratically with the level of the voltage fluctuation. Furthermore, if appropriate stored characteristic curves, which take into account predictable reference changes, as is known per se, can be used according to an embodiment in order to carry out the reference value approximation particularly efficiently; it is accordingly advantageous if a reference value profile based on stored characteristic curve data is used as the basis for the approximation of the reference value ($F_{Ref}$). It is also advantageous if a temporarily comparatively high limiting value is used for a motor starting process in order to quickly approximate the reference value to the pronounced force changes during the starting process. In this context, it is favorable for a simple calculation if a limiting value which drops exponentially from a comparatively high initial value is used.

The present approach of force tracking can lead to a situation in which a portion of the trapping process is compensated and therefore is lost in terms of the detection of the trapping. In order to limit this possibility, as mentioned, a rather low limiting value is introduced. However, if a relatively high limiting value is predefined, only more relatively rigid objects with a large increase in force in the differential force can be detected selectively in terms of trapping. With existing anti-trapping algorithms it is often difficult to detect very rigid objects in good time. Such hard objects are, for example, the 65 N/mm spring constant required according to US Guideline FMVSS 118 S5, and if a high limiting value is defined, such rigid or hard objects can be satisfactorily detected since all other "interference" is strongly filtered. It is then possible to carry out a separate additional trapping detection for such specific objects, with a correspondingly high limiting value being used as the basis, which limiting value is then specifically matched to such hard objects. This can be complemented further by, for example, providing in each case a separate trapping detection process for various specific degrees of object hardness (in particular the legally required object hardness values 10 N/mm, 20 N/mm and 65 N/mm). As a result, quite specific triggering thresholds can be defined for the different object hardness values. The trapping forces for the different object hardness values can therefore be easily kept constant, which increases the robustness of the system.

Accordingly, it is of particular advantage if a limiting value which is adjusted to the rigidity of trapped objects is defined for the limitation, wherein the limiting value is higher the greater the degree of rigidity of the trapped object, wherein it is particularly favorable if at least two force tracking processes are carried out in parallel with different limiting values in order to perform adapted approximations of the reference value to the force values separately for trapped objects with different degrees of rigidity.

FIG. 1 is a schematic block circuit diagram of an adjustment device 1 with an electric motor 2 for driving a motor vehicle component (not illustrated otherwise in more detail) such as a sunroof, wherein central computer means 3 (CPU 3)

are provided as an essential component of the device 1 in order to carry out actuation, for example PWM actuation, of the motor 2 by means of a PWM switch 4; this PWM switch 4 is illustrated only schematically in FIG. 1 and is generally implemented in practice by using, for example, a field-effect transistor (FET). The PWM switch 4 applies, in accordance with a pulse duty ratio which is predefined by the computer means 3, a supply voltage $U_{Bat}$, which is applied to terminals 5, 6 of the device 1, to the motor 2. The voltage $U_{Mot}$ which is actually applied to the motor 2 is optionally measured using measuring means 7, wherein the corresponding measured values are fed to the computer means 3. In the example shown, a sensor 8 is also provided for measuring the rotational movement, specifically with respect to the detection of the position s, speed v and angular speed ω and/or force of the motor 2; this sensor 8 can be used to form a control system, additionally or instead of the measuring means 7, and said sensor 8 can be, for example, a Hall sensor. The output signal (measurement signal) of the sensor 8 is also fed to the computer means 3. Furthermore, the computer means 3 are connected to a memory 9 in which data relating to the mechanical characteristic curve of the adjustment device 1 or of the mechanical system of this adjustment device are stored. A possible characteristic curve F(t) is illustrated by way of example by the curve 10 in FIG. 3, wherein it is apparent that the force F changes as a function of the time t or of the position s of, for example, a sunroof. This force F which changes with the adjustment travel (positions) is therefore known to the device 1.

From FIG. 1 it is then clear that measuring means 11 for measuring the supply voltage $U_{Bat}$ are also present, wherein the measured values are also fed to the computer means 3. The computer means 3 form, in a way which is conventional per se, a PWM actuation means for the motor 2, which PWM actuation means are implemented by a PWM module 3A in FIG. 1 in combination with the PWM switch 4. An antitrapping module which is indicated by a module 3B in the computer means 3 is connected thereto, wherein to the antitrapping system, which also includes switching relays 12, 13, and also to be able to reverse the motor 2 after reduction of the motor speed in the case of detection of trapping, as is known per se.

The switching relays 12, 13 are shown schematically in FIG. 1 in their normal operating positions, wherein when the motor 2 reverses, both change the switched position. In the position of rest (not shown), both switching relays 12, 13 assume their position which is the upper one according to FIG. 1, i.e. they then both bear on the terminal 5, as is indicated with a dashed line in the case of the switching relay 12 in FIG. 1. The PWM switch 4 is open in the position of rest.

In a refinement of the embodiment shown, it is, for example, also conceivable to provide, instead of the switching relays 12, 13 and the PWM switch (FET) 4, a full bridge with four FETs which are actuated by the computer means 3 via the (then combined) modules 3A, 3B in order to carry out on the one hand the PWM actuation of the motor 2 and on the other hand the reversing of the motor.

It is apparent from the illustration in FIG. 1 that the supply voltage $U_{Bat}$ and optionally the motor voltage $U_{Mot}$ and the motor rotational speed ω can be considered as predefined variables, i.e. these variables are measured and the reaction occurs thereto. This reaction relates to the PWM actuation, wherein the motor voltage $U_{Mot}$ is set with the PWM module 3A and the PWM switch 4.

In particular, physical conditions define the relationship between the voltage $U_{Mot}$ at the motor, the force F at the motor and the angular speed ω of the motor as follows:

The static motor equation $$U_{Mot}=k_\omega \cdot \omega + R \cdot I$$

gives rise to $$I = \frac{U_{Mot} - k_\omega \cdot \omega}{R}.$$

where:
I . . . motor current (armature current) of the motor 2
$k_\omega$ . . . proportionality factor (motor constant) and
R . . . armature resistance.

If a further motor constant $k_m$ is predefined as a proportionality factor, the torque M of the motor 2, when plotted against this constant $k_m$ is proportional to the armature current I:

$$M = k_m \cdot I = \frac{k_m}{R}(U_{Mot} - k_\omega \cdot \omega)$$

With the radius r of the cable winding of the motor and the respectively given translation ratio ü, the force F is obtained at the Bowden cable and therefore at the sunroof etc. as follows:

$$F = \frac{ü}{r}M = \frac{ü \cdot k_m}{r \cdot R}(U_{Mot} - k_\omega \cdot \omega)$$

The following relationship is therefore obtained between the force F, the motor voltage $U_{Mot}$ and the angular speed ω

$$F = k_1 \cdot U_{mot} + k_2 \cdot \omega,$$

wherein only known system constants k1, k2 occur in addition to the abovementioned variables in this equation.

This closing force which is calculated according to the relationship above is used, according to the prior art, as the basis for the trapping detection. The closing force changes here if an object, for example an arm, a hand or else a head, is trapped by the driven component, for example a motor vehicle side window or a sunroof. The closing force can, however, also change during operation, without an object being trapped, if the ambient conditions change. It is thus possible, for example for friction forces in seals to change owing to temperature changes and to bring about a fluctuation enclosing force. It is then necessary to prevent such mechanical changes in force owing to changed peripheral conditions such as, for example, temperature changes etc., from being detected as trapping of an object, but instead to be able to ensure that these mechanical changes of force are differentiated from fluctuations in force which are caused by trapped objects.

Figure 2:
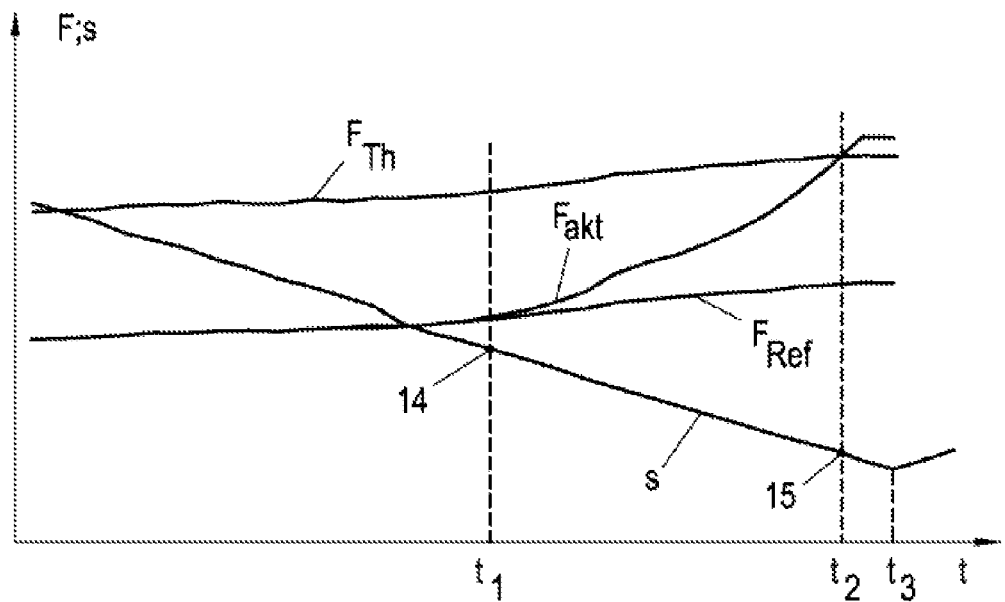
FIG. 2 is a schematic view of a diagram which shows the time profile of the actual force $F_{akt}$, of the reference force $F_{Ref}$ and of the threshold value $F_{th}$ as well as also of the position of the moved components over time.

With respect to the general explanation, FIG. 2 illustrates a diagram in which, for example, a profile of the current force $F_{akt}$, and also the profile of a reference force $F_{Ref}$ as well as, parallel to the latter, the profile of a threshold value, of a threshold value force $F_{Th}$, are illustrated. In addition, FIG. 2 shows the movement of the driven component, for example a sunroof, during the closing process by means of the profile of the position s, wherein in the normal case, this position profile occurs approximately linearly with time. According to FIG. 2, a trapping process then starts at the position 14, at a time $t_1$, wherein, as a result of the trapped object, the actual force $F_{akt}$ rises relatively strongly relative to the reference force $F_{Ref}$ until the threshold value $F_{Th}$ is reached at the time $t_2$, at the position 15. When the threshold value $F_{Th}$ is reached, the system, i.e. the computer means 3 in FIG. 1, decides that a trapping process is occurring, wherein as a result the motor 2 is stopped and reversed, which is indicated at the time $t_3$ in the context of the profile of the positions in FIG. 2. However, in the example in FIG. 2, the forces $F_{akt}$ and $F_{Ref}$ are uniform up to the time $t_1$, i.e. no mechanical fluctuations in force occur.

Figure 3:
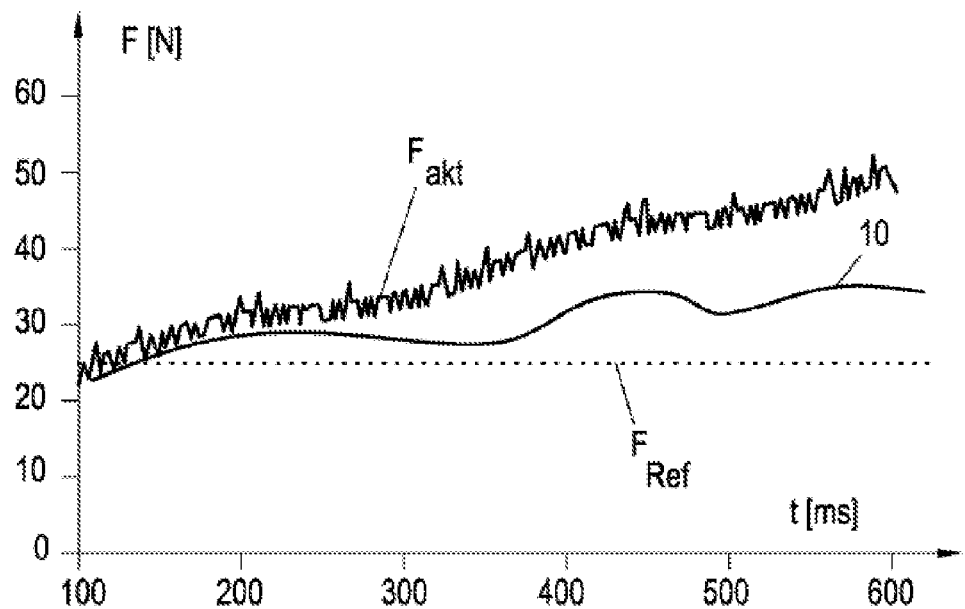
FIG. 3 shows in somewhat more detail the profile of the actual force compared to a constant force reference value or to a reference force characteristic curve obtained in accordance with stored characteristic diagrams, wherein it can be seen that the anticipated force profile moves away from the real force profile.
Figure 4:
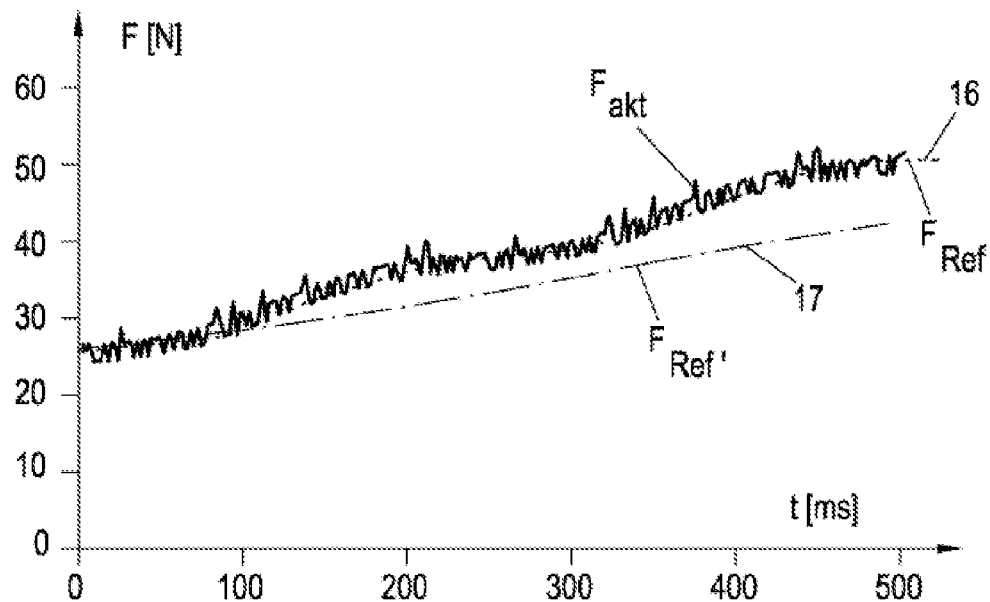
FIG. 4 shows the profile of the current force and the profile of the reference force in a diagram corresponding to FIG. 3, specifically on the one hand for the case of full compensation according to the method and on the other hand for partial compensation.

However, such mechanical fluctuations in force occur, for example, in FIGS. 3 and 4 for the current force $F_{akt}$, wherein it is apparent that the reference force $F_{Ref}$ moves away from the current force $F_{akt}$. In the diagram according to FIG. 3, the—anticipated—force profile is, as mentioned above, additionally entered here with the curve 10, owing to the stored characteristic curve data. Gradual removal of the current force $F_{akt}$ owing to other parameters in the mechanical system, for example changed friction values but also the occurrence of contamination etc., is also found to occur in connection with this curve 10, which takes into account from the outset the parameters for the anticipated curve profile which are inherent in the mechanical system, and which curve can be recorded empirically at the beginning when the anti-trapping system is installed. This moving apart of values indicates, for example, relative difficulty of movement of a mechanism which has developed (in certain areas or generally), and this gradual movement apart of values, this relatively slow deviation of the force $F_{akt}$ from the reference force $F_{Ref}$, will now be differentiated from a relatively pronounced increase owing to trapping of an object.

Figure 5:
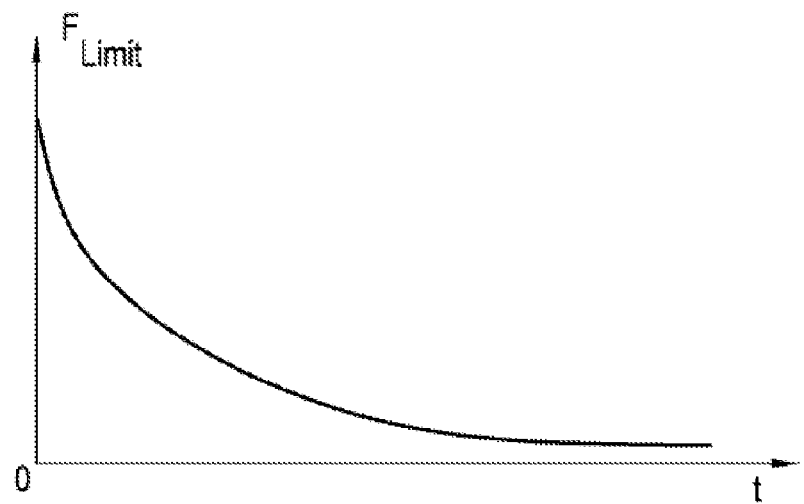
FIG. 5 shows a diagram of a possible position-dependent or time-dependent profile of a limiting value $F_{Limit}$ which is used for the "force tracking"

This is achieved by virtue of the fact that in the course of "force tracking" the reference value or the reference force $F_{Ref}$ is continuously approximated or adjusted toward the current force $F_{akt}$. However, this force tracking is limited in absolute terms in order to prevent trapping processes also being compensated. The limitation is accordingly to be cited such that mechanical changes in force which lead to movement apart of values, such as is shown in FIGS. 4 and 5, are compensated or "attenuated", whereas, owing to the significantly higher rates of increase in the case of trapping processes, compared to the mechanical fluctuations, the specified limitation involves only insignificant attenuation by the force tracking.

For example, the following relationship can be used for this limited approximation of the reference values $F_{Ref}$ to the current force $F_{akt}$, wherein, in this relationship $F_{Ref}(s)$ denotes the reference force in the position s and $F_{akt}(s)$ denotes the measured (current) force of the mechanism in this position s; furthermore, the distance between two successive positions, where corresponding determination of the force and the approximation occurs, is denoted by $\Delta s$; and the reference force therefore occurs at a subsequent position $s+\Delta s$ as follows:

$$F_{Ref}(s+\Delta s)=F_{Ref}(s)+\min[F_{akt}(s)-F_{Ref}(s),F_{Limit}]$$

In this relationship, $F_{Limit}$ denotes a limiting value which is to be predefined for the force tracking, i.e. a "tracking limit". This limiting value describes the maximum rigidity of a virtual object which is trapped in the mechanism and is also fully compensated by the force tracking. The relationship above applies to positive deviations, that is to say to $F_{akt}(s) \geq F_{Ref}(s)$. The present force tracking can, however, also be provided in the case of negative deviations, that is to say for $F_{akt}(s) \geq F_{Ref}(s)$, wherein the following then applies:

$$F_{Ref}(s+\Delta s)=F_{Ref}(s)-\min[F_{Ref}(s)-F_{akt}(s),F_{Limit}]$$

In an ideal case when there are no fluctuations in the mechanical system, i.e. the difference value $\Delta F$ between $F_{akt}$ and $F_{Ref}=0$, the reference value $F_{Ref}$ does not change either. In the case of differences between the current force value $F_{akt}$ and the reference value $F_{Ref}$, this difference is used for compensation, i.e. added to the temporary reference value $F_{Ref}(s)$ or subtracted therefrom in order to arrive at the reference value in the next position $s+\Delta s$ as long as this difference value does not exceed the limiting value $F_{Limit}$. Otherwise, the limiting value $F_{Limit}$ is used for the approximation.

In an ideal case, this limiting value $F_{Limit}$ is selected such that the profile according to curve 16 in FIG. 4 is obtained for the approximated reference value $F_{Ref}$. However, if the limiting value $F_{Limit}$ is comparatively smaller, the profile according to the curve 17 is obtained for the reference value s. $F_{Ref}'$ in FIG. 4. In this case, a linear increase occurs since a constant value, specifically $F_{Limit}$, is added to the preceding reference value at each "sampling" interval $\Delta s$. However, this is just one example of several possibilities.

The present method of reference value approximation can be combined, for example with particular advantage with stored mechanical characteristic diagrams, with reference values corresponding to the curve profile 10 in FIG. 3, wherein a reference value corresponding to this curve 10, that is to say, a reference value which is not constant, is then used as the output reference value $F_{Ref}$ in the preceding relationships. The reference value which is obtained is then not formed merely by the described force tracking on the basis of a constant value but is instead obtained as a sum of the reference force profile 10 (according to the characteristic curve of the mechanism) and the force tracking component according to the previous relationships in the case of mechanical force fluctuations.

The limiting value $F_{Limit}$ for the force tracking was assumed above to be a constant, for example. However, this does not necessarily have to be the case, as instead a variable limiting value $F_{Limit}$ can also be advantageously used in the present reference value approximation, wherein by means of the variable of the limiting value $F_{Limit}$ it is possible to make allowance for the conditions of the mechanical system.

For example, a temporarily high limiting value $F_{Limit}$ can be provided for the motor starting process, said limiting value $F_{Limit}$ decreasing, for example, according to an exponential curve as time (or travel) progresses, as is apparent from the diagram in FIG. 5. A high limiting value $F_{Limit}$ is therefore used in the starting phase, so that even pronounced force fluctuations can be compensated in this starting phase. This ensures that in this phase the reference value $F_{Ref}$ corresponds as reliably as possible to the current force $F_{akt}$ which changes very strongly in this time interval. However, the limiting value, i.e. the tracking limit, is then gradually reduced until the low, for example constant, value which can be seen in FIG. 5, in the right-hand part of the diagram, is reached for the steady running of the motor.

In a similar way, temporarily increased limiting values $F_{Limit}$ can also prove advantageous, for example if, depending on the position, for example when a sunroof is in a specific position near to the closed state and there is a wind deflector, a mechanically unreproducible behavior occurs (for example as a function of the temperature). Accordingly, in this region the tracking limit can be increased as a function of the position in order to be able to better compensate such disruption.

An alternative approach taking into account such an increased rise in force at a specific (intermediate) position, i.e. problem point, would be to increase the triggering threshold $F_{Th}$, at this point. However, as has become clear, an increased force requirement after the problem point in the position profile (where such an increased force requirement can occur) is not accommodated, in contrast to the previously described force-tracking technology.

Figure 6:
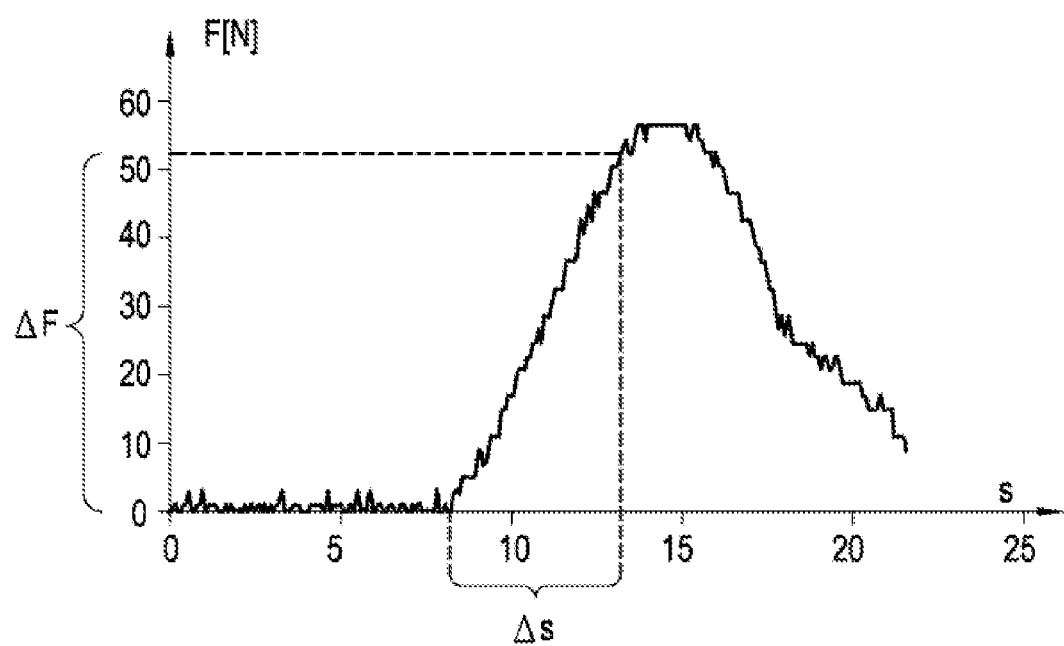
FIG. 6 shows a diagram of the conventional profile of a difference in the closing force as a function of the adjustment travel, i.e. the position s.

In this context, reference is made, to begin with to the diagram according to FIG. 6 which shows that the absolute value of the closing force is used as a criterion for the detection of trapping but rather the difference ΔF between the closing force at a specific time and the closing force at a defined time in the past. The interval between these times is selected such that the rigidity of the objects to be detected is allowed for. Static influences are eliminated by the formation of differences. However, a disadvantage of this solution is that there is a large requirement for buffering space for the comparison values from the past and that only a limited section from the past is used for the detection of trapping, but information from further back cannot be used.

Figure 7:
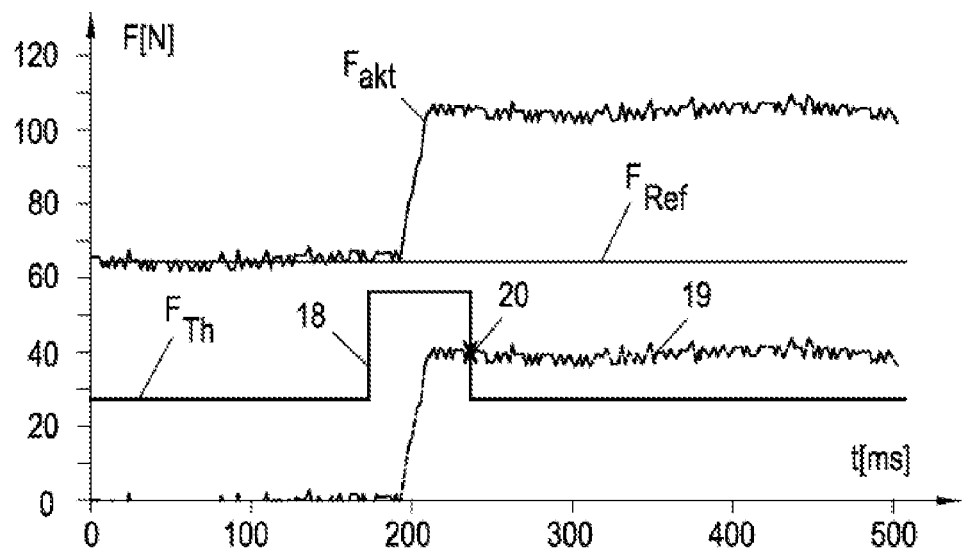
FIGS. 7 and 8 show, in comparable diagrams, on the one hand (FIG. 7) in the upper part a profile of the actual closing force without approximated reference and in the lower part the profile of a differential force without force tracking and an associated triggering threshold, wherein it is clear that, without the approximation or force tracking according to various embodiments incorrect reversal can occur as a result of incorrect detection of trapping, and (FIG. 8) in the upper part a corresponding closing force profile with approximated reference and in the lower part the profile of the differential force or of the triggering threshold with force tracking.
Figure 8:
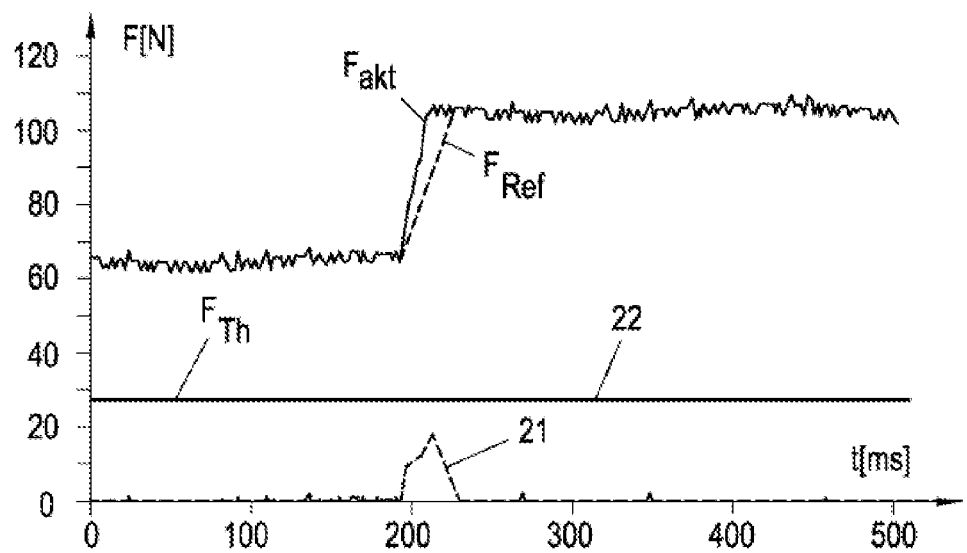

FIGS. 7 and 8 each show, in the upper part, force profiles for the current force $F_{akt}$ and for the non-approximated reference force $F_{Ref}$ (FIG. 7) and respectively for the approximated reference $F_{Ref}$ (FIG. 8). The approximated reference profile is obtained in the way described above, cf. in particular also FIG. 4. It is apparent that a problem point is present in the mechanical system in the region around the time "200 ms". According to FIG. 7, in this region the triggering threshold $F_{Th}$ is briefly increased beforehand, this increase being denoted by 18 in FIG. 7. Curve 19 denotes the differential force which is obtained without force tracking, as described above. In this context, it is apparent from 20 in the diagram according to FIG. 7 that this approach according to the prior art would disadvantageously lead to incorrect reversal.

If, according to FIG. 8, a differential force which is determined according to the principle of force tracking is then used as the basis, cf. curve 21, the threshold value—which is here constant, for example, according to the straight line 22, is not reached; incorrect detection of trapping therefore does not occur in the region of the problem point 18 (FIG. 7), and therefore incorrect reversal does not occur.

Apart from these time-dependent or position-dependent variations in the limiting value $F_{Limit}$, variable (increased) limiting values can also prove expedient for the case of voltage fluctuations in the on-board power system voltage $U_{Bat}$ (cf. FIG. 1). In this case, a portion in the relationships above which is proportional to the level of the voltage fluctuation can be added to the specified limiting value $F_{Limit}$. This term which is due to the voltage fluctuation can be determined, for example, by virtue of the fact that a voltage value ($U_{LP}(t)$ is subtracted, after low-pass filtering, from the unfiltered voltage $U_{Bat}(t)$. The following relationship is therefore obtained for this modified limiting value $F_{Limit}'$:

$$F_{Limit}'=F_{Limit}+k\cdot|U_{Bat}(t)-U_{LP}(t)|$$

Figure 9:
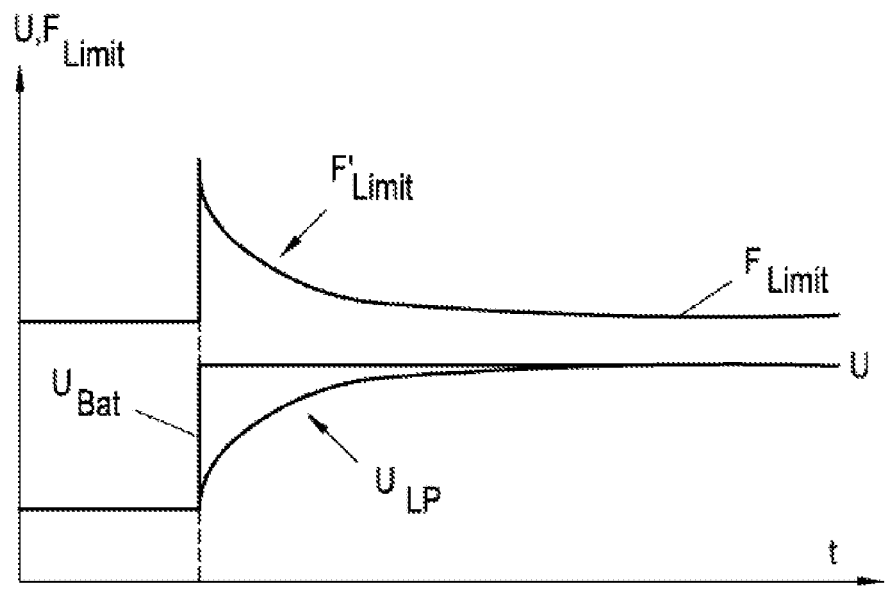
FIG. 9 shows a diagram of the profile of the battery voltage, i.e. motor supply voltage, a low-pass-filter voltage and an "adapted" limiting value.

In this context, k is a system parameter which indicates to what extent the limiting value has to be increased as a function of the level of the voltage current. This system parameter k can then be determined empirically in advance. FIG. 9 shows by way of example a corresponding profile of $F_{Limit}$ (or $F'_{Limit}$) in conjunction with a suddenly rising battery voltage $U_{Bat}$ and a low-pass-filtered voltage $U_{LP}$.

Instead of the constant system parameter k, it is also conceivable to use a parameter k as a function of the voltage U, that is to say k(U), wherein a non-linear relationship between k and U is possible. In particular, it is conceivable here that a quadratic relationship is provided between k and U, that is to say the parameter k increases quadratically with the level of the voltage jump.

For example, the battery voltage rises at the end of a cranking pulse, and in the case of such a rising voltage a force profile can occur which corresponds to that according to FIGS. 7 and 8. This influence can be eliminated by a correspondingly increased limiting value $F_{Limit}'$, so that incorrect reversal is avoided.

Figure 10:
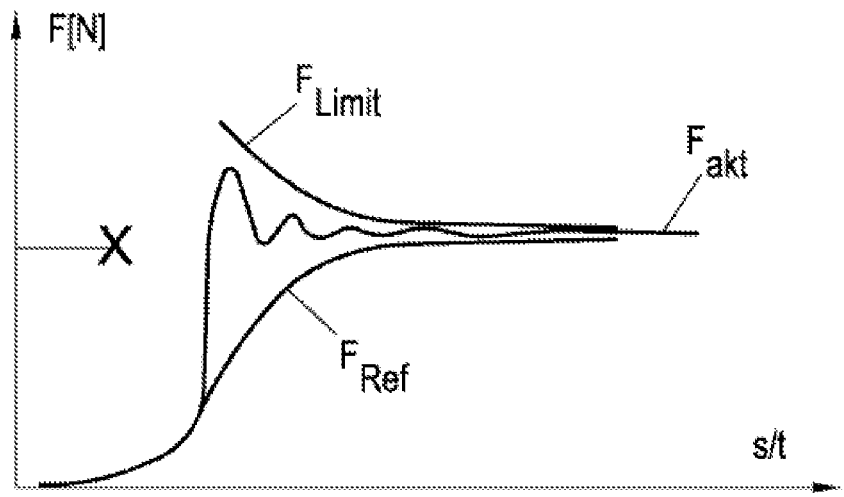
FIG. 10 shows the profile of a current force, of an associated reference during an approximation and the associated threshold value in a starting phase of the motor.
Figure 11:
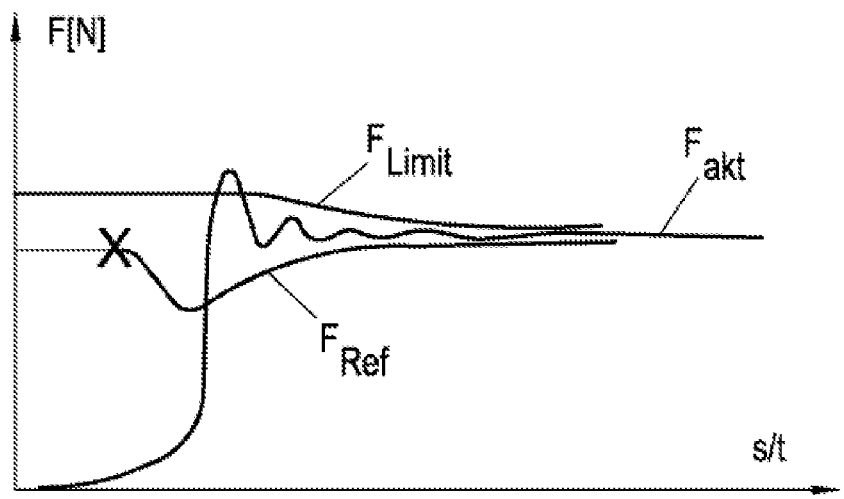
FIG. 11 shows a diagram which is comparable to FIG. 10, but here, in contrast to FIG. 10, a stored force value is used as the basis, in which case the approximation of the starting phase can be accelerated when the last displacement force which is still stored is used as the starting value, with the result that the steady-state of the algorithm is reached earlier.

A further embodiment is obtained if the last displacement movement is only a short time in the past and the displacement force remains relatively satisfactorily constant. It is then possible for the last displacement force to be used as a starting value for the reference force $F_{Ref}$ for this special case of just a short interruption, as a result of which the starting value can be better adapted to the force tracking and the starting phase can be shortened, with the result that the steady state of the algorithm is reached earlier. This is apparent from a comparison of FIG. 10 with FIG. 11, wherein in FIG. 10 the force tracking is started virtually at zero after the displacement movement is switched off and the displacement movement is started again just afterwards, with the result that it is a relatively long period of time until the reference value $F_{Ref}$ is approximated to the current force $F_{akt}$. However, if, as illustrated in FIG. 11, the value of the displacement force which is provided when the motor is switched off is stored and is used as a starting value for the force tracking, for the reference value $F_{Ref}$.

A quicker approximation of the reference value to the actual force $F_{akt}$ can be achieved.

While various embodiments were explained above, further refinements and modifications are also possible within the scope of the invention. It is therefore also conceivable, for example, to carry out the described force tracking in calculation processes which are carried out in parallel with one another, using different limiting values and in a way which is matched to various rigidity values of objects. With a relatively high limiting value it is therefore possible to ensure that only particularly rigid objects are taken into account with a large increase in force. It is sometimes desired and not easy to detect very rigid objects in good time in this context. Such hard objects are, for example, 65 N/mm springs, such as are required in the US Guideline FMVSS 118 S5. If a relatively high limiting value is then defined, such rigid or hard objects can be detected well since all other disruption is highly filtered. It is therefore conceivable to carry out an additional, separate detection of trapping for such rigid objects, in parallel with the detection of trapping for relatively soft objects, in order therefore to detect specifically such hard objects or rigid objects. This approach can be generalized by respectively carrying out separate detection of trapping for prescribed specific object hardness values, in particular for the legally required object hardness values 10 N/mm, 20 N/mm and 65 N/mm, with separate approximation of the reference value using a separate limiting value which is matched to the respective object hardness value. As a result, quite specific triggering thresholds $F_{Th}$ can be predefined for different object hardness values.

Moreover, the various embodiments can, of course, also be applied in adjustment devices 1 without PWM actuation (as shown in FIG. 1), wherein other methods of actuation, in particular methods of actuation involving relays, are known in the prior art.

What is claimed is:
1. A method for detecting a trapping situation when a driven component is adjusted using a mechanical adjustment system comprising an electric motor, the method comprising:
    measuring a voltage supplied to the electric motor and a rotational movement of the electric motor;
    calculating a force acting on the driven component based at least in part on the voltage supplied to the electric motor or the rotational movement of the electric motor;

comparing the force acting on the driven component with a threshold value which is related to a reference value using a computer means, the reference value stored in a non-transitory medium in communication with the computer means;

continuously approximating the reference value, and therefore the threshold value, in the sense of force tracking, to the force which changes as a function of the mechanical system during the adjustment; and if a difference between the force acting on the driven component and the reference value exceeds a first threshold value adjusted to the rigidity of a first potential trapped object, identifying a first possible trapping situation; and if the difference between the force acting on the driven component and the reference value exceeds a second threshold value adjusted to the rigidity of a second potential trapped object, identifying a second possible trapping situation.

2. The method according to claim 1, wherein the continuous approximation of the reference value is limited in terms of absolute value in order to extract changes which are due to trapping processes.

3. The method according to claim 2, wherein, in the case of positive deviations in the force values $F_{akt}$ from the reference value $F_{Ref}$, specifically $F_{akt}(s) \geq F_{Ref}(s)$ where s=the position of the driven component, the reference value $F_{Ref}$ is approximated according to the relationship $$F_{Ref}(s+\Delta s) = F_{Ref}(s) + \min[(F_{akt}(s) - F_{Ref}(s)), F_{Limit}],$$

where $s+\Delta s$ denotes the position following the position s, and $F_{Limit}$ denotes a predefined limiting value as a tracking limit.

4. The method according to claim 2, wherein, in the case of negative deviations, that is to say $F_{akt}(s) < F_{Ref}(s)$, where s=the position of the driven component, the reference value is approximated according to the relationship $$F_{Ref}(s+\Delta s) = F_{Ref}(s) - \min[(F_{Ref}(s) - F_{akt}(s)), F_{Limit}],$$

where $s+\Delta s$ denotes the position following the position s, and $F_{Limit}$ denotes a predefined limiting value as a tracking limit.

5. The method according to claim 3, wherein a uniform limiting value $F_{Limit}$ is predefined for the approximation both in the case of positive and in the case of negative deviations of the force values from the reference value.

6. The method according to claim 2, wherein a variable limiting value is predefined for the limitation.

7. The method according to claim 6, wherein the limiting value is dependent on the position of the driven component.

8. The method according to claim 6, wherein the limiting value is dependent on fluctuations in the motor voltage.

9. The method according to claim 6, wherein a reference value profile based on stored characteristic curve data is used as the basis for the approximation of the reference value.

10. The method according to claim 6, wherein a temporarily comparatively high limiting value is used for a motor starting process in order to quickly approximate the reference value to the pronounced force changes during the starting process.

11. The method according to claim 10, wherein a limiting value which drops exponentially from a comparatively high initial value is used.

12. The method according to claim 2, wherein a limiting value which is adjusted to the rigidity of trapped objects is defined for the limitation, wherein the limiting value is higher the greater the degree of rigidity of the trapped object.

13. The method according to claim 12, wherein the two threshold values are used in order to perform adapted approximations of the reference value to the force values separately for trapped objects with different degrees of rigidity.

14. A device for detecting a trapping situation when a driven component is adjusted using a mechanical adjustment system comprising an electric motor, wherein a value which is related to the force acting on the driven component is compared with a threshold value which is related to a reference value, the device comprising:

sensors measuring a volatge supplied to the electric motor and rotational movement of the electric motor;

a non-transitory computer readable medium storing a reference value for a force acting on the driven component; and computer means in communication with the non-transitory computer readable medium which are configured to:
calculate an actual force acting on the driven component based at least in part on the voltage supplied to the electric motor or the rotational movement of the electric motor;

compare the actual force acting on the driven component with a threshold value which is related to a reference value, and to continuously approximate the reference value, and therefore the threshold value, in the sense of force tracking, to the force value which changes as a function of the mechanical system during the adjustment movement;

wherein the reference value depends at least in part on the position of the mechanical system during the adjustment;

if a difference between the force acting on the driven component and the reference value exceeds a first threshold value adjusted to the rigidity of a first potential trapped object, identifying a first possible trapping situation; and if difference between the force acting on the driven component and the reference value exceeds as second threshold value adjusted to the rigidity of a second potential trapped object, identifying a second possible trapping situation.

15. The device according to claim 14, wherein the continuous approximation of the reference value is limited in terms of absolute value in order to extract changes which are due to trapping processes.

16. The device according to claim 15, wherein, in the case of positive deviations in the force values $F_{akt}$ from the reference value $F_{Ref}$, specifically $F_{akt}(s) \geq F_{Ref}(s)$ where s=the position of the driven component, the reference value $F_{Ref}$ is approximated according to the relationship $$F_{Ref}(s+\Delta s) = F_{Ref}(s) + \min[(F_{akt}(s) - F_{Ref}(s)), F_{Limit}],$$

where $s+\Delta s$ denotes the position following the position s, and $F_{Limit}$ denotes a predefined limiting value as a tracking limit.

17. The device according to claim 15, wherein, in the case of negative deviations, that is to say $F_{akt}(s) < F_{Ref}(s)$, where s=the position of the driven component, the reference value is approximated according to the relationship $$F_{Ref}(s+\Delta s) = F_{Ref}(s) - \min[(F_{Ref}(s) - F_{akt}(s)), F_{Limit}],$$

where $s+\Delta s$ denotes the position following the position s, and $F_{Limit}$ denotes a predefined limiting value as a tracking limit.

18. The device according to claim 16, wherein a uniform limiting value $F_{Limit}$ is predefined for the approximation both in the case of positive and in the case of negative deviations of the force values from the reference value.

19. The device according to claim 15, wherein a variable limiting value is predefined for the limitation.

20. The device according to claim 19, wherein the limiting value is dependent on the position of the driven component.

* * * * *